(12) United States Patent
Korin

(10) Patent No.: US 8,276,504 B2
(45) Date of Patent: Oct. 2, 2012

(54) HOT-AIR POPCORN MACHINE ESPECIALLY WITH A SEASONING COATER

(75) Inventor: Mikhail Korin, Moscow (RU)

(73) Assignee: Pavel Polynovkin, Moscow Region (RU)

( * ) Notice: Subject to any disclaimer, the term of this patent is extended or adjusted under 35 U.S.C. 154(b) by 414 days.

(21) Appl. No.: 12/592,106

(22) Filed: Nov. 18, 2009

(65) Prior Publication Data
US 2011/0088562 A1    Apr. 21, 2011

(30) Foreign Application Priority Data
Oct. 19, 2009 (RU) .................................. 2009138278

(51) Int. Cl.
*A23L 1/18* (2006.01)

(52) U.S. Cl. ........... 99/323.5; 99/323.9; 34/583; 34/585

(58) Field of Classification Search ................. 99/323.5, 99/323.6, 323.7, 323.8, 323.9, 323.11; 34/585, 34/583, 582, 588, 594
See application file for complete search history.

(56) References Cited

U.S. PATENT DOCUMENTS

| | | | | |
|---|---|---|---|---|
| 2,241,754 A | * | 5/1941 | Wilsey ......................... 99/323.5 |
| 3,529,359 A | * | 9/1970 | Fukuyo ........................... 34/582 |
| 3,953,190 A | * | 4/1976 | Lange ............................. 65/335 |
| 4,727,798 A |   | 3/1988 | Nakamura |
| 4,841,884 A | * | 6/1989 | Engstrom et al. .............. 110/298 |
| 5,359,788 A | * | 11/1994 | Gell, Jr. ........................... 34/360 |
| 5,421,253 A |   | 6/1995 | Rehmeyer et al. |
| 5,996,480 A | * | 12/1999 | Kelley et al. ..................... 99/468 |
| 6,088,934 A | * | 7/2000 | Newton .......................... 34/360 |
| 6,187,353 B1 | * | 2/2001 | Wyman et al. ................ 426/233 |
| 6,234,064 B1 |   | 5/2001 | Turrel |
| 6,460,451 B1 | * | 10/2002 | Helman et al. ............... 99/323.5 |
| 7,024,986 B2 |   | 4/2006 | Kurosawa |

\* cited by examiner

*Primary Examiner* — Reginald L Alexander
(74) *Attorney, Agent, or Firm* — Aleksandr Smushkovich

(57) ABSTRACT

A popcorn making machine includes a main unit comprising a fan pumping air into a chamber, enclosing a heater and a bowl. The bowl has sidewalls tapered downwardly with mini-nozzles attached thereto. Hot airflows are introduced from the chamber through the mini-nozzles into the bowl tangentially to its inner surface, forming a main hot airflow circulation. A central nozzle is mounted at the bowl's bottom, including slots, introducing additional airflows, tangential to the nozzle's surface, from the chamber into the bowl, forming an additional hot airflow circulation surrounding the nozzle, co-directed with the main circulation. The main unit comprises a receptacle collecting popcorn coming from the bowl. The claimed machine optionally includes a coater unit for coating popcorn with oil, salt, etc., and a compact cabinet enclosing the main and coater units. The above design provides for a fast and essentially even heating of corn kernels for efficient popping thereof.

11 Claims, 6 Drawing Sheets

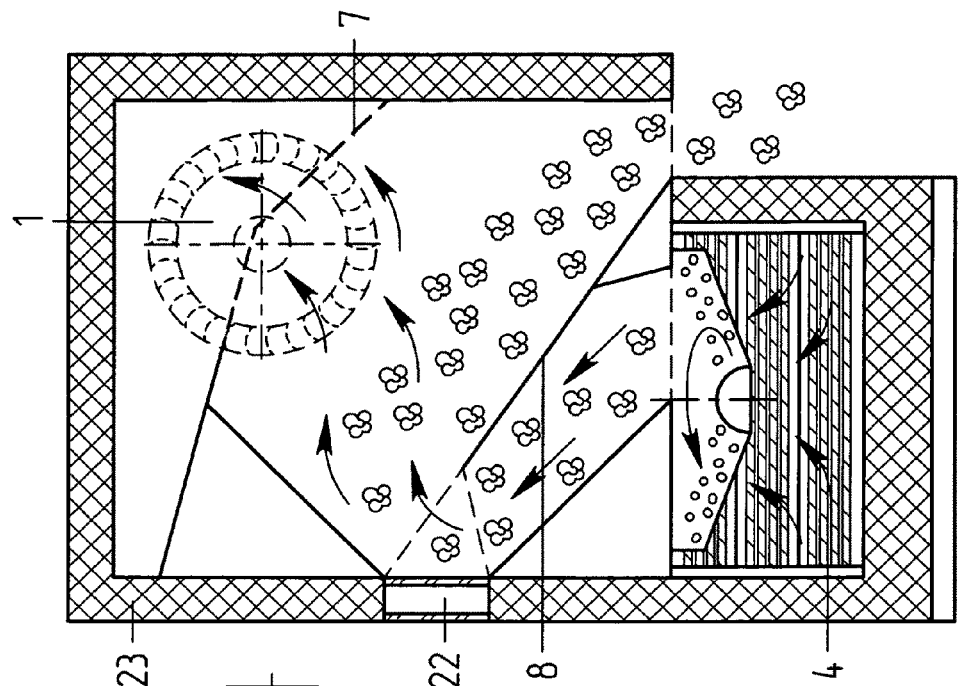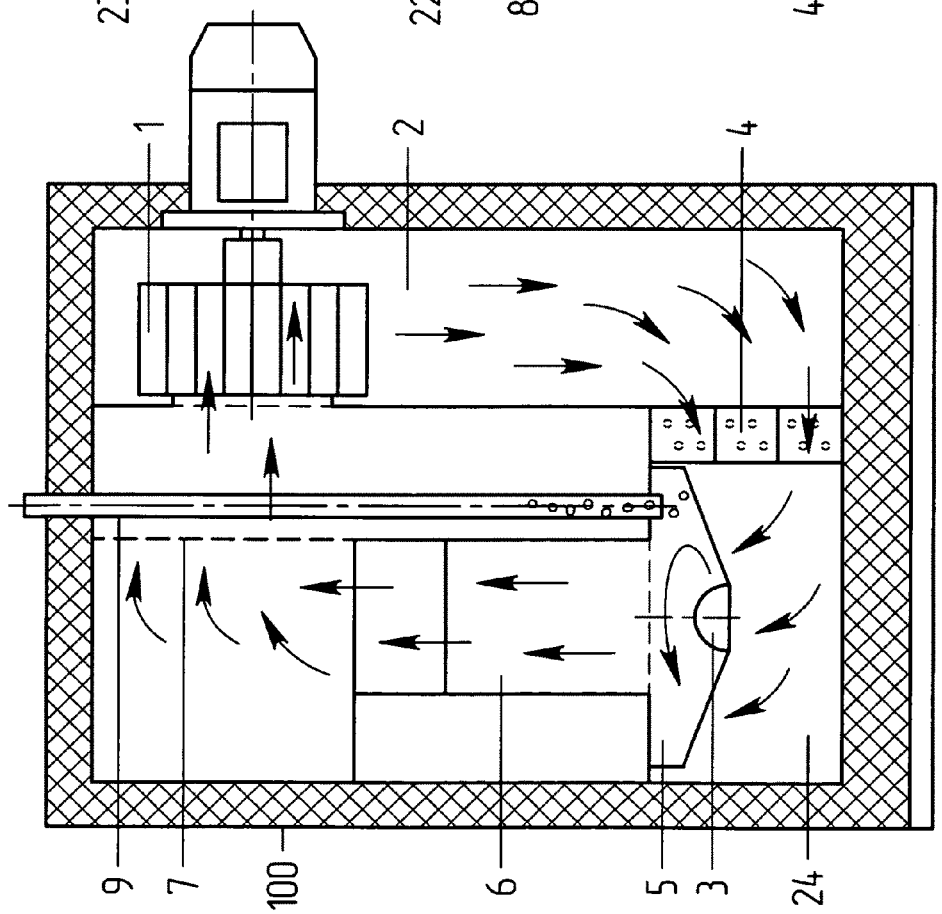

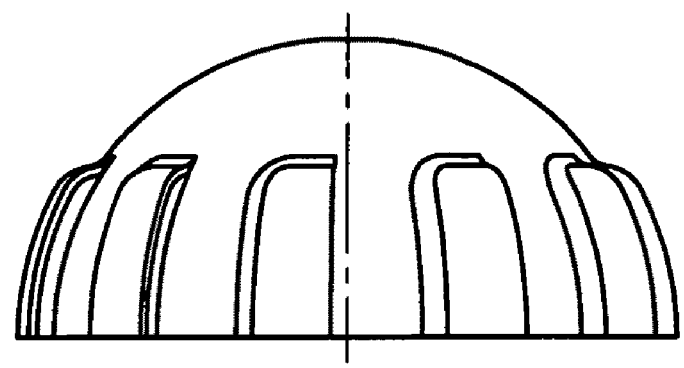
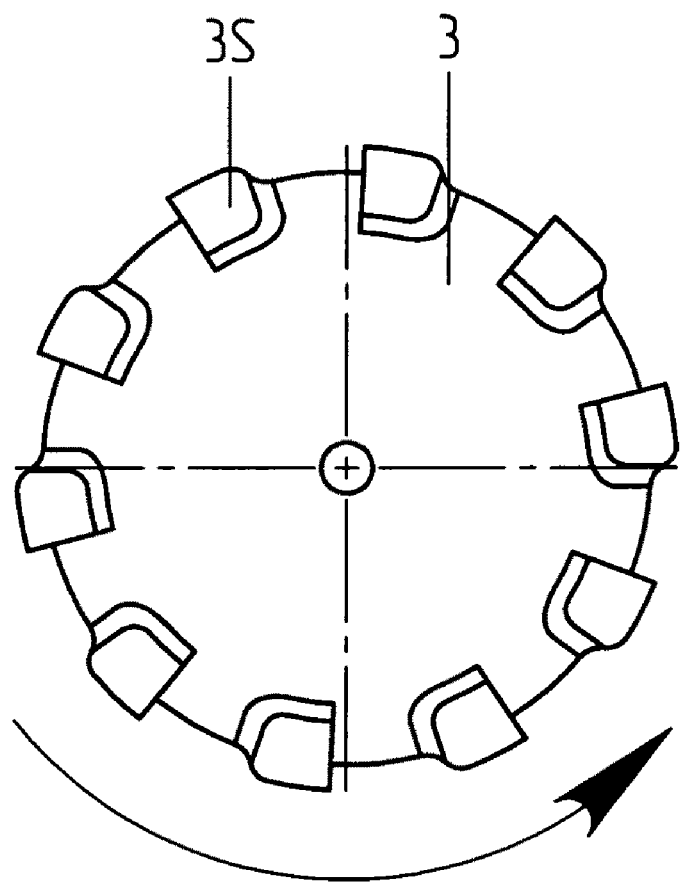
Fig. 5

HOT-AIR POPCORN MACHINE ESPECIALLY WITH A SEASONING COATER

CROSS-REFERENCE TO RELATED APPLICATIONS

This application is a U.S. utility application, which claims priority under 35 U.S.C. 119 (a) through (d) from a Russian Federation patent application RU2009138278 filed on 19 Oct. 2009, hereby incorporated by reference in its entirety.

FIELD OF THE INVENTION

This invention relates to corn popping machines, particularly to the popcorn preparation machines utilizing the continuous popping of corn kernels by means of a hot airflow.

BACKGROUND OF THE INVENTION

There are known a variety of devices for popcorn processing, for example, the one taught in U.S. Pat. No. 7,024,986 that describes "a popcorn maker including a self-regulating heating unit. The self-regulating heating unit provides a regulated heat to the popcorn maker. The self-regulating heating unit can be configured to maintain a predetermined temperature for the popcorn maker. The predetermined temperature can be adjusted to provide appropriate amount of heat to the popcorn maker for popping a maximum number of corn kernels while limiting the heat from causing damage to heating coils and thermoplastic parts of the popcorn maker. The self-regulating heating unit includes a positive temperature coefficient heater."

Another U.S. Pat. No. 5,421,253 teaches a 'convection oven corn popper and method' that " . . . is provided to air-pop popcorn in combination with a convection-type oven. The device comprises a spring-mounted bowl to hold corn kernels and includes a slot in the sidewall for popped popcorn to exit therefrom. The exiting popcorn falls into the cooking chamber of the oven where it is held warm until ready to eat."

"A portable heat-concentrating kettle cooker" is taught in U.S. Pat. No. 6,234,064, in particular, having "a housing with a burner supported within the housing and a kettle carrier pivotably attached to a top edge of the housing such that it can be pivoted from a substantially horizontal position across the top of the housing to a substantially vertical position. The kettle carrier includes a cooking kettle that is positioned over the burner when the kettle carrier is in its substantially horizontal position, and when the kettle carrier is in its substantially vertical position, the cooker kettle is positioned to empty its contents into a tub that is supported next to the housing by a detachable frame extending from the housing. Additional features of the cooker include a heat intensification chamber formed by a wall around the burner in order to redirect radiant energy from the burner back into the heat intensification chamber. A cooking oil receptacle is also detachably mounted to the housing. Fuel supplied to the heater can be natural gas, propane, or electricity, with fuel supply lines passing through a fuel supply/control chamber at the front of the housing and fuel regulating controls positioned on the front of the housing."

As believed, a related art device, being the closest to the present invention, is taught in U.S. Pat. No. 4,727,798 issued to Nakamura (herein further called 'Nakamura') that discloses a "popcorn processing machine has a heating chamber into which a measured quantity of raw corn kernels are fed in each operational cycle to be heated, agitated, and thus popped by only a hot air supplied under pressure as a whirling rising vortex, without the use of an oil, whereby greatly expanded puffs of popcorn of uniform quality are produced in a high yield and in a short processing time. The bottom of the heating chamber can be opened by a simple mechanism, whereby the popped popcorn product can be quickly dumped and the chamber bottom rapidly reclosed, the operational cycle time thereby being extremely short."

Designers of popcorn making machines often encounter a common problem particularly described in Nakamura: "In a typical popcorn processing machine known heretofore, a receiving dish or pan into which corn kernels are charged is provided above a heat source. At the bottom of this pan, agitator vanes for rotating along the upper surface of the pan bottom are fixedly supported on a vertical shaft. Accordingly, when the vertical shaft is rotated, the vanes rotate within the pan thereby to agitate the raw corn kernels as they are heated by the heat source, whereby the corn kernels are heated and popped into expanded state to fill the interior of the pan. In such a machine, oil is ordinarily placed in the pan in order to cause the raw corn kernels to pop rapidly. As a consequence of the agitation of the corn kernels, this oil tends to be scattered together with minute particles of the corn against the inner surface of a transparent cover installed for observation around the sides of the pan. The oil and corn particles thus adhere to the glass cover, thereby dirtying the glass and causing it to become opaque. Furthermore, if these contaminants are left in adhering state, they will attract undesirable insects such as cockroaches and are therefore very unhygienic. Since an opaque condition of the glass cover prevents or obstructs observation of the corn popping progress, the contaminants must be frequently wiped off by hand, which is an inconvenient task. However, if oil is not used in order to prevent this contamination, the time for popping the raw corn becomes disadvantageously long. Furthermore, the construction of the machine itself in this case has been complicated because of the necessity of providing rotational support means and driving means for the agitator vanes."

As shown above, Nakamura solves this problem by supplying "a hot air supplied under pressure as a whirling rising vortex, without the use of an oil" into the heating chamber with an openable bottom for popping. Thereafter, "the popped popcorn product can be quickly dumped and the chamber bottom rapidly reclosed, the operational cycle time thereby being extremely short." However, the "whirling rising vortex" conditions an increased density of kernels in the lower central region of the chamber, wherein the speed of kernels and temperature of hot air are essentially minimal, which leads to uneven heating the kernels located in this region that slows down the overall heating of corn kernels in the chamber thereby decelerating the whole process of popcorn preparation. Besides, the movable bottom of the heating chamber reduces the overall reliability and maintainability of the Nakamura's machine.

BRIEF SUMMARY OF THE INVENTION

A primary aim of the claimed invention is to provide a simply designed hot-air popcorn making machine enabling a fast and essentially even heating of corn kernels for efficient popping thereof.

Another aim of the claimed invention is to raise the overall reliability and maintainability of popcorn making machines.

Another aim of the claimed invention is to provide an optional preferred embodiment of the inventive machine including an additional unit ('coater') for coating the popped corn with oil, salt, etc.

Other aims and particular applications of the claimed invention may become apparent to one skilled in the art upon learning the present disclosure.

These aims are achieved by providing an inventive popcorn making machine, which is disclosed herein. The popcorn making machine includes a main unit, comprising: a fan, pumping air into a heating chamber, which heating chamber encloses a heater and a bowl. The bowl has sidewalls tapered downwardly with mini-nozzles attached to the internal surface of sidewalls. Hot airflows are introduced from the chamber through the mini-nozzles into the bowl tangentially to its inner surface, thereby forming a main hot airflow circulation. A central nozzle is mounted at the bottom of the bowl. The central nozzle includes predeterminedly configured slots, capable of introducing additional hot airflows, directed tangential to the nozzle's surface, from the chamber into the bowl, thereby forming an additional hot airflow circulation surrounding the nozzle, co-directed with the main circulation. The main unit comprises a receptacle that collects popcorn coming from the bowl. The inventive machine may preferably include a transparent window that allows for observing the popcorn making process.

The machine optionally includes a coater unit for coating popcorn with oil, salt, etc., and a compact cabinet enclosing the main and coater units. The coater unit comprises: a slowly rotating mixing drum, preferably shaped as a cylinder with sidewalls having a plurality of predeterminedly sized openings, through which un-popped and poorly popped corn kernels are sifted into a tray disposed under the drum; the drum receives the popcorn kernels coming out from an unloading pipe, connected to a first flat side of the drum. The drum on its inner surface is furnished with an auger capable of moving the popped kernels into a consumption container disposed at a second flat side of the drum, the container is used for receiving and holding the 'ready-to-eat' popcorn. The coater unit comprises a number of devices: an oil tank supplying oil to an oil feeding device that controllably draws oil into an oil dispenser, longitudinally extended essentially throughout the interior of drum and spreading oil through longitudinal guides, essentially along the entire length of the drum; a salt container, supplying salt to a salt feeding device that controllably draws salt into a salt dispenser, longitudinally extended essentially throughout the interior of drum and spreading salt through the longitudinal guides intended for mixing the popcorn. The mentioned devices are properly associated with the drum.

BRIEF DESCRIPTION OF DRAWINGS

FIG. 1 shows a front view of an embodiment of hot-air popcorn making machine, according the claimed invention.

FIG. 2 shows a lateral view of the embodiment of hot-air popcorn making machine shown on FIG. 1.

FIG. 5 shows a lateral sectional view and a plan view of a central nozzle, being a part of an embodiment of hot-air popcorn making machine, according the claimed invention.

Identical elements on different figures are denoted with the same reference numerals, unless otherwise is indicated in the description. A first time introduced numeral in the description is enclosed into parentheses.

DETAIL DESCRIPTION OF PREFERRED EMBODIMENTS OF THE INVENTION

Figure 3:
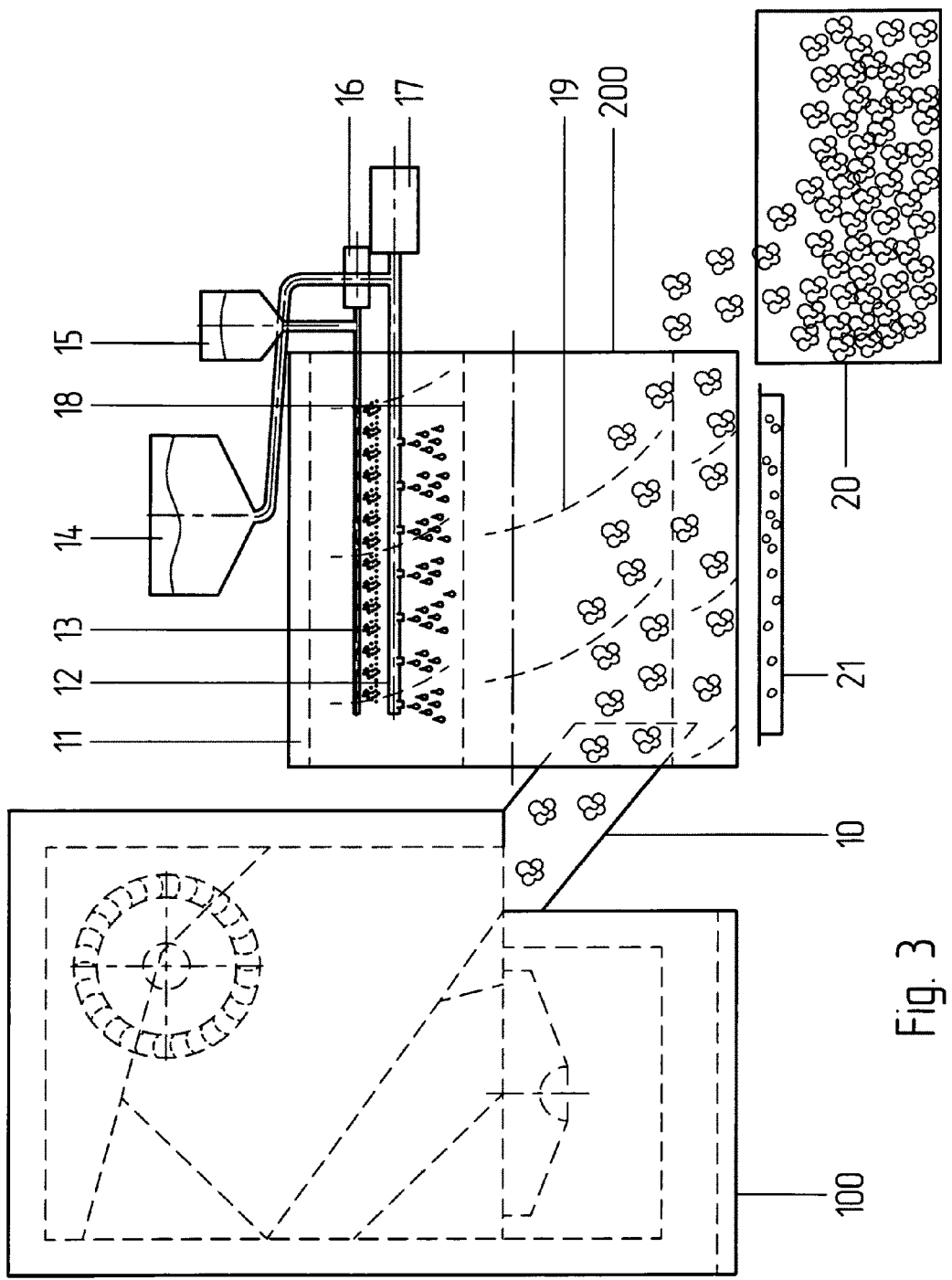
FIG. 3 shows a schematic view of a preferred embodiment of hot-air popcorn making machine, including a 'coater' unit, according to the claimed invention.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Main Unit

Figure 6:
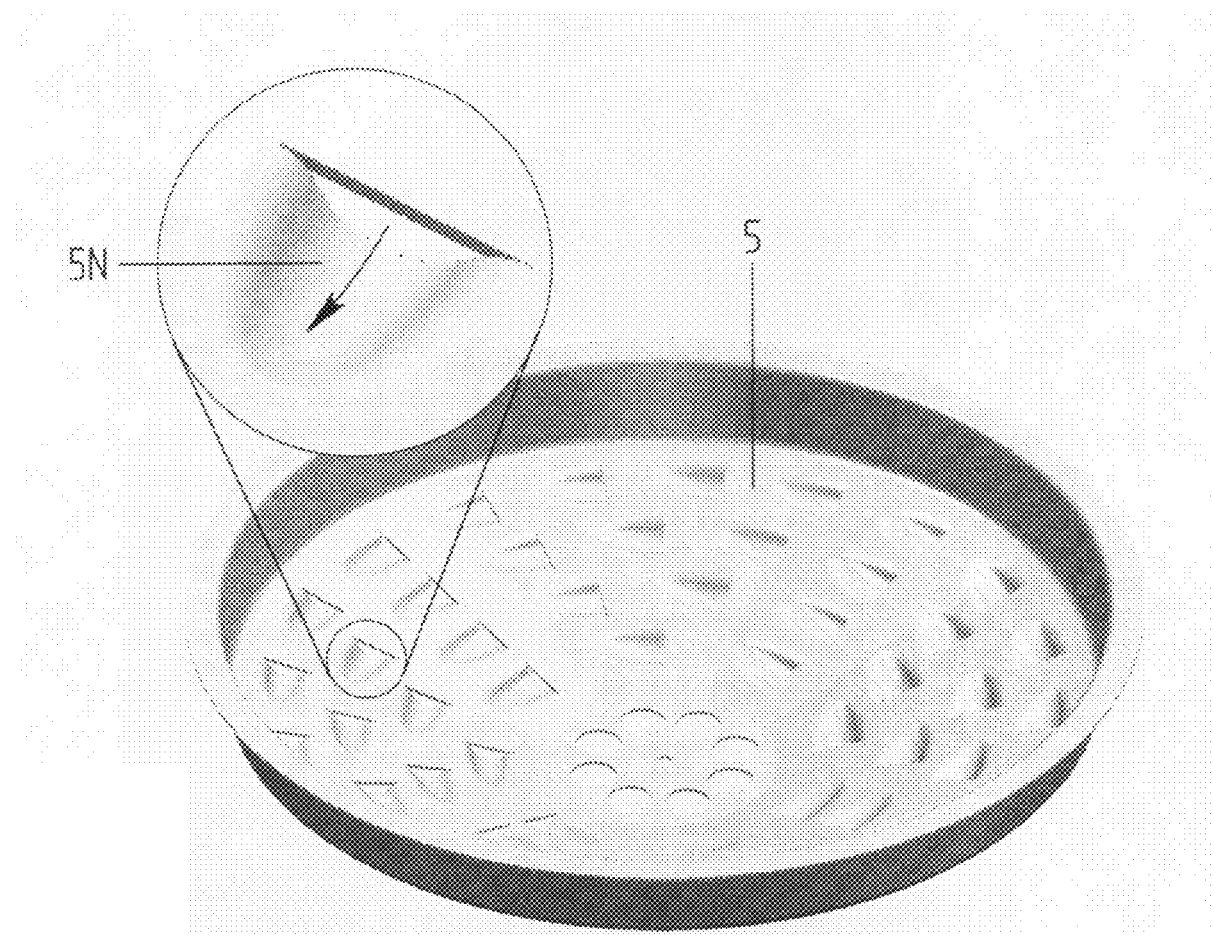
FIG. 6 shows an isometric view of a bowl, being a part of an embodiment of hot-air popcorn making machine, according the claimed invention.
Figure 7:
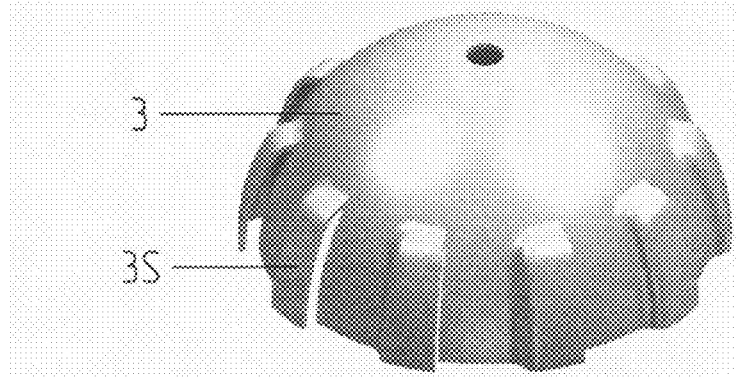
FIG. 7 shows an isometric view of a central nozzle, being a part of an embodiment of hot-air popcorn making machine, according the claimed invention.

A preferred embodiment of the inventive popcorn making machine claimed herein comprises a main unit (100) illustrated on FIGS. 1, 2, 3, and 8. In turn, in the preferred embodiment, the main unit 100 comprises a casing (23), containing: a transparent window (22); a fan (1), preferably having a controllable (adjustable) rotation speed; a heating chamber (24); an airflow pipe (2) communicating the fan 1 and the heating chamber 24; a heating bowl (5) having sidewalls (preferably shaped as a truncated cone tapered downwardly, illustrated on FIGS. 1,2,3,4), having a top cover and a bottom opening, the bowl 5 is mounted in the upper region of heating chamber 24, the bowl 5 has a plurality of 'mini-nozzles' (5N) i.e. openings with a predetermined shape (preferably shaped as portions of an ellipse, or a paraboloid, or a similar volumetric geometrical figure, as depicted on FIGS. 4, 6), each mini-nozzle 5N is attached to the internal sidewalls of bowl 5, and covers an orifice made in the sidewalls (as depicted on FIG. 6) so that hot airflows can be introduced from the heating chamber 24 through the orifices and the mini-nozzles into the interior of bowl 5 toward horizontal directions essentially tangential to the inner surface of the bowl 5 (herein also called 'mini-nozzle airflows'), while all the mini-nozzle airflows collectively produce a main hot airflow circulation within the bowl 5, the main circulation is whirled spiral-wise (e.g. in the clockwise direction); a heater (4) mounted in the heating chamber 24, the heater 4 preferably has a suitable shape outwardly embracing the bowl 5, the heater 4 can be represented by any suitable type of conventional heater (preferably an electric coil outwardly surrounding the sidewalls of bowl 5, as shown on FIGS. 1 and 2, and powered from a suitable electrical source, not shown herein, preferably supplying controllable voltage); a central nozzle (3) having a hollow convex (preferably, semi-spherical) shape opened downward and peripherally coupled with its flat opening to the bottom opening of bowl 5, the central nozzle 3 has a plurality of equidistantly situated and predeterminedly configured slots (3S) (as shown on FIG. 5 and FIG. 7), preferably shaped as louvers, preferably aligned in meridian directions, and preferably having outstanding narrow air-guiding ribs attached to one (e.g. left) side of each slot at a predetermined angle, the ribs are used to form additional hot airflows from every slot 3S directed essentially tangential to the outer surface of the central nozzle (herein also called 'slot airflows'), while all the slot airflows collectively produce an additional hot airflow circulation in the lower region of bowl 5, surrounding the central nozzle 3. The additional circulation is oriented toward the direction of the main circulation (in this example, toward the clockwise direction).

The main unit 100 also comprises a feeding (loading) pipe (9), shown on FIG. 1, through which raw corn is supplied into the bowl 5 at a predetermined, preferably adjustable, rate; a receptacle (8) mounted above the heating chamber 24, the receptacle 8 preferably has a bottom inclined at a predetermined angle (e.g. configured as shown on FIG. 2), the receptacle 8 is provided for collection of the already popped corn kernels; an intermediate pipe (6), shown on FIG. 1, which communicates the receptacle 8 with the bowl 5, the pipe 6 is preferably connected to the top cover of bowl 5 and to a suitable place (essentially in the lower region) of the receptacle 8; an unloading pipe (10) for output of the substantially popped corn kernels, and a grid (7), being one of the walls of receptacle 8, the grid 7 prevents corn kernels, borne by the airflow, from getting into the zone of fan 1. The transparent window 22 should preferably be situated on the casing 23 substantially at a level of the grid 7.

Coater Unit

Figure 4:
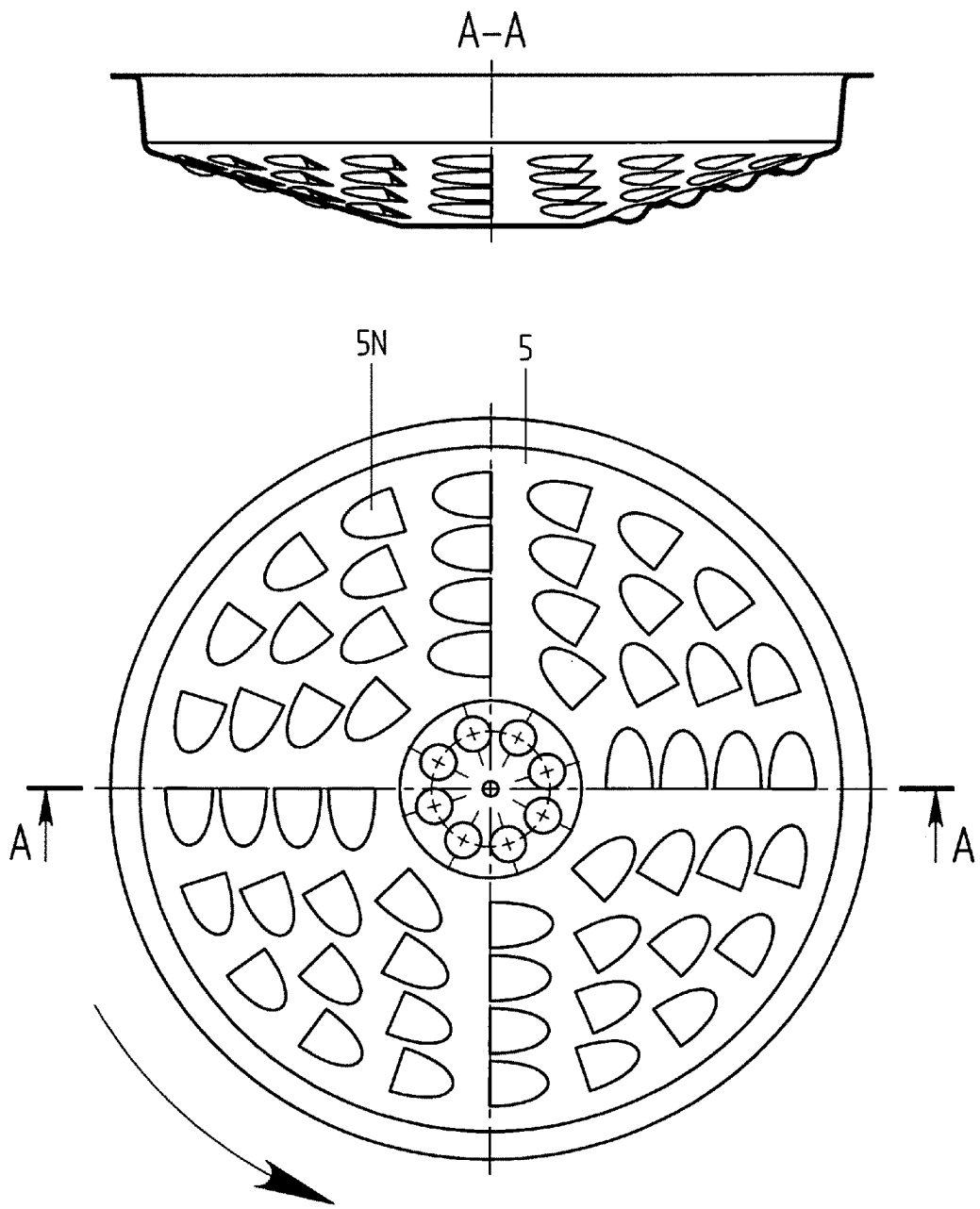
FIG. 4 shows a lateral sectional view and a plan view of a bowl, being a part of an embodiment of hot-air popcorn making machine, according, the claimed invention.
Figure 8:
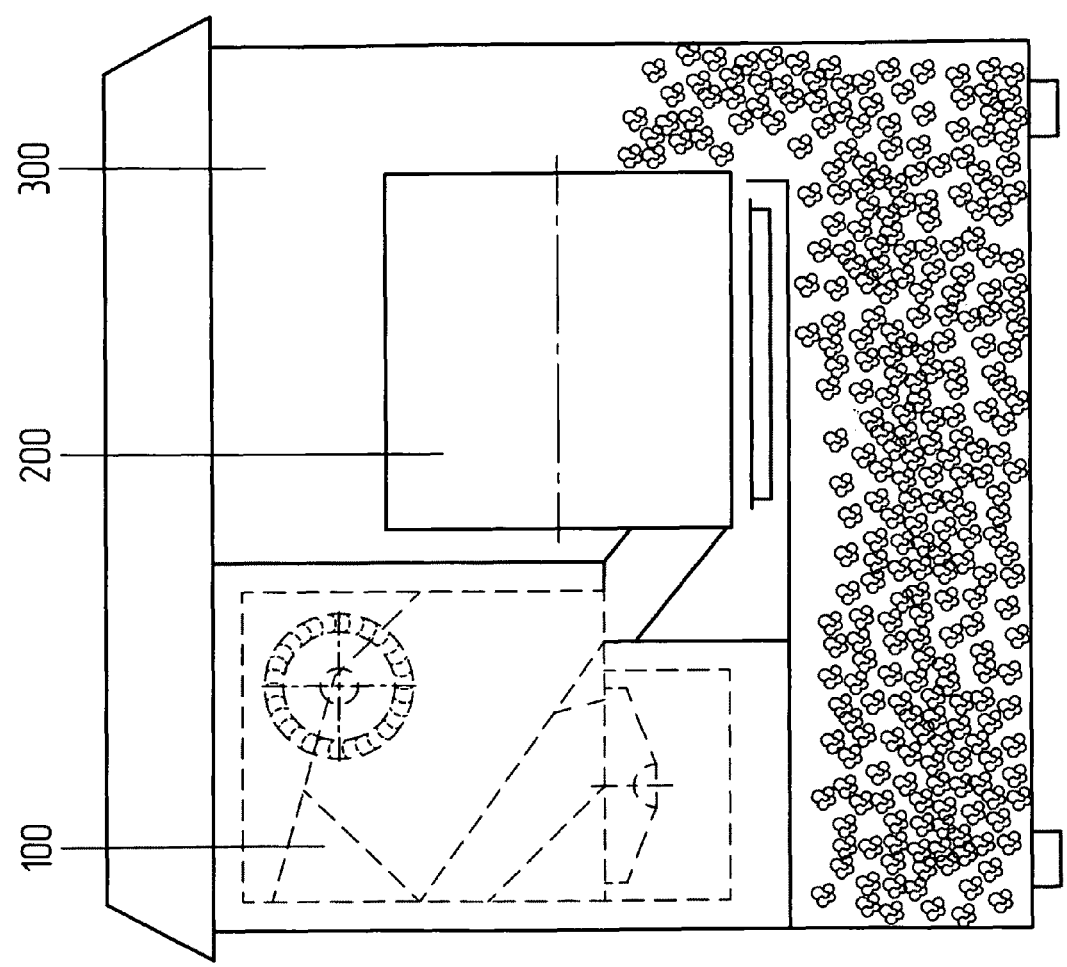
FIG. 8 shows a general schematic view of a pop-corn making machine combining a main unit, a coater, and a compact cabinet containing the main unit and the coater, according the claimed invention.

In addition to the main unit 100, a preferred (combined) embodiment of the inventive popcorn making machine claimed herein may additionally comprise a coater unit (200), illustrated on FIGS. 3 and 8. The claimed popcorn making machine in alternative embodiments may comprise only the above described main unit 100 without any coater unit.

The coater unit 200, exemplarily illustrated on FIG. 3, is intended for coating the already popped corn kernels, for instance, with oil and salt. The coater unit 200 comprises a slowly rotating mixing drum (11), preferably shaped as a cylinder with sidewalls having a plurality of predeterminedly sized openings (preferably circular holes with a diameter of about 10 mm), through which un-popped and poorly popped corn kernels are sifted into a tray (21) disposed under the drum; the drum 11 receives the popcorn kernels coming out from the unloading pipe 10 connected to a first flat side of the drum, the drum 11 on its inner surface is furnished with an auger (19) capable of moving the popped kernels into a consumption container (20) disposed at a second (opposite) flat side of the drum, the container 20 is used for receiving and holding the 'ready-to-eat' popcorn; an oil tank (14) supplying oil to an oil feeding device (17) that controllably draws oil into an oil dispenser (12), longitudinally extended essentially throughout the interior of drum 11 and spreading oil through longitudinal guides (18) essentially along the entire length of the drum 11; a salt container (15) supplying salt to a salt feeding device (16) that controllably draws salt into a salt dispenser (13), longitudinally extended essentially throughout the interior of drum 11 and spreading salt through the longitudinal guides 18 intended for mixing the popcorn. The oil tank 14, device 17, dispenser 12, container 15, device 16, dispenser 13, and guides 18 are properly associated with the drum 11.

Compact Cabinet

In a preferred (combined) embodiment depicted on FIG. 8, the inventive hot-air popcorn making machine includes a compact cabinet (300), enclosing the main unit (100) and the coater unit (200). Optionally, the ready-to-eat popcorn can be kept within the cabinet 300 (as shown on FIG. 8), instead of keeping it in the aforementioned consumption container 20.

Operation of the Combined Embodiment

The popping process, taking place in the combined embodiment of the claimed machine, comprises two stages. During the first stage the kernels are heated and popped (FIGS. 1 and 2). During the second stage (FIG. 3) the popped kernels are seasoned with additives, giving them special tastes and flavors, such as salt and oil. Alternatively, other additives can be used as well.

At the first stage, raw corn kernels are fed into the bowl 5 via the pipe 9. The fan 1 pumps an airflow via the pipe 2 into the chamber 24, wherein the airflow is heated by the heater 4, and further introduced into the bowl 5 via the mini-nozzles 5N and the slots 3S, creating the main and additional circulations respectively, and making the kernels circulate within the bowl 5.

The hot airflow cycle is closed (in other words, there is no intake of cold air), the kernels are heated very fast to the popping temperature. Popped kernels are carried away by the airflow though the pipe 6. The grid 7 prevents popped kernels from getting into the zone of fan 1. The gravity force makes popped kernels fall down essentially onto the bottom of receptacle 8, and slope out though the unloading pipe 10.

The speed of airflow is adjusted in such a way that new kernels are not carried away from the bowl 5, whereas old damaged kernels, essentially un-popped kernels, and corn shells are carried away by the airflow. This occurs because the damaged kernels and shells have been dried out by the hot airflow, and consequently have lesser masses. This allows the claimed popcorn making machine to operate substantially permanent and the un-popped corn and shells are not accrued in the bowl 5.

At the second stage, the popped kernels from the pipe 10 get into the drum 11. With the drum slowly rotating, the guides 18 mix the popcorn, and the auger 19 moves it over to the unloading zone and into the consumption container 20. The un-popped and poorly popped kernels are sifted into the tray 21 through the aforementioned openings made in the drum 11. The oil tank 14, oil feeding device 17, oil dispenser 12, salt container 15, salt feeding device 16, and salt dispenser 13 provide coating the popped corn kernels with oil and salt correspondingly. Thusly, the container 20 collects and stores the ready-to-eat popcorn coated with the additives.

I claim:

1. A popcorn making machine including a main unit, said main unit comprises:
    a fan;
    a heating chamber communicated with said fan;
    a heating bowl disposed within said heating chamber, said bowl including:
        sidewalls tapered downwardly,
        a bottom opening, and
        a plurality of predeterminedly configured mini-nozzles internally attached to said sidewalls;
        wherein each said mini-nozzle covers an orifice made in the sidewall so that hot airflows can be introduced from said heating chamber through said orifices and said mini-nozzles into the interior of said bowl toward directions, essentially tangential to the inner surface of said bowl, and collectively forming a main hot airflow circulation within said bowl;
    a heater means for heating air mounted within said heating chamber; and
    a central nozzle having:
        a convex shape with a bottom flat opening, peripherally coupled to said bottom opening of the bowl, and
        a plurality of equidistantly situated and predeterminedly configured slots, such that additional hot airflows can be introduced from said heating chamber through said slots into said bowl;
        wherein said additional hot airflows are directed such that collectively forming an additional hot airflow circulation surrounding said central nozzle, and said additional circulation is oriented essentially toward the direction of said main circulation.

2. The popcorn making machine according to claim 1, wherein said bowl is shaped as a truncated cone.

3. The popcorn making machine according to claim 1, wherein said mini-nozzles are shaped as portions of an ellipse or a paraboloid.

4. The popcorn making machine according to claim 1, wherein said central nozzle is shaped as a semi-sphere, and said slots are shaped as louvers, aligned in meridian directions, and having outstanding air-guiding ribs attached to one side of each slot at a predetermined angle.

5. The popcorn making machine according to claim 1, further comprising:
  a feeding means for supplying raw corn kernels into said bowl at a predetermined rate;
  a receptacle for collection of already popped corn kernels, said receptacle is mounted above said heating chamber, said receptacle including:
    a bottom inclined at a predetermined angle, and
    a grid, being one of the walls of said receptacle and separating said receptacle from said fan;
  and an intermediate pipe communicating said receptacle with said bowl.

6. The popcorn making machine according to claim 5, further including a coater unit, said coater unit comprises:
  a rotating mixing drum, shaped as a cylinder including sidewalls, having a plurality of predeterminedly sized openings, a first flat side, and a second flat side, the first flat side is connected to said receptacle, so that said drum is capable of receiving popped corn kernels from said receptacle,
  an auger mounted within said drum, and capable of moving the popped kernels toward the second flat side;
  a number of longitudinal guides mounted within said drum;
  an oil dispenser, longitudinally extended essentially throughout the interior of said drum, and capable of spreading oil through said longitudinal guides;
  an oil feeding device associated with the drum, and capable of controllably drawing oil into said oil dispenser;
  an oil tank associated with the drum, and capable of supplying oil to said oil feeding device;
  a salt dispenser, longitudinally extended essentially throughout the interior of said drum, and capable of spreading salt through said longitudinal guides;
  a salt feeding device associated with the drum, and capable of controllably drawing salt into said salt dispenser; and
  a salt container associated with the drum, and capable of supplying salt to said salt feeding device.

7. The popcorn making machine according to claim 6, wherein said predeterminedly sized openings are made as circular holes with a diameter of substantially 10 mm.

8. The popcorn making machine according to claim 6, further comprising a consumption container disposed at the second flat side of said drum and usable for receiving and holding the ready-to-eat popcorn.

9. The popcorn making machine according to claim 6, further comprising a tray capable of receiving un-popped and poorly popped corn kernels sifted through said predeterminedly sized openings, said tray is disposed under said drum.

10. The popcorn making machine according to claim 6, further including a compact cabinet, enclosing said main unit and said coater unit.

11. The popcorn making machine according to claim 1, further comprising a transparent window.

* * * * *